May 16, 1944.   B. GÁSPÁR   2,348,735
METHOD OF AND MATERIAL FOR PRODUCING
CORRECTED PHOTOGRAPHIC IMAGES
Filed Jan. 24, 1941

Inventor
Bela Gaspar,
By F. Gerald Toye
Attorney

Patented May 16, 1944

2,348,735

UNITED STATES PATENT OFFICE 2,348,735

METHOD OF AND MATERIAL FOR PRODUCING CORRECTED PHOTOGRAPHIC IMAGES

Béla Gáspár, Hollywood, Calif., assignor to Chromogen, Incorporated, a corporation of Nevada Application January 24, 1941, Serial No. 375,850

15 Claims. (Cl. 95—2)

My invention pertains to the use of multilayer materials for the making of color photographic images and, more particularly, the making of corrected color separation images as well as the production of corrected final multicolor images.

For the purpose of three-color photography, the entire range of the visible light spectrum is divided into three parts; first, the blue spectral range of 400–500 m$\mu$; second, the green spectral range of 500–600 m$\mu$; and third, the red spectral range of 600–700 m$\mu$. In the production of subtractive multicolor images, the three dyestuffs used for the production of the three color separation images are yellow, magenta and blue-green. These dyestuffs have a main absorption in the blue spectral range; in the green spectral range; and in the red spectral range respectively. The absorption curves of most of the dyes utilizable for the production of subtractive multicolor images show, however, that these dyes not only have a main absorption as above indicated but show also that these dyes absorb, in addition, considerable amounts of light in the short wave part of the spectral range. In other words, the absorption range of a dye which has its absorption maximum in the long wave portion of the spectrum also overlaps the absorption range of a dye which has its absorption maximum in the short wave portion of the spectrum. For example, most blue-green dyes which should only absorb red light rays also absorb a certain amount of the green and blue light rays. Likewise, most magneta dyes not only absorb green light but also absorb a certain amount of blue light. Furthermore, many dyes, more particularly those produced by color development, have an unusually high opacity for light rays of the same color as the dye.

This overlapping of the absorption curves results in an incorrect reproduction of the original color separation image due to the unwanted absorption in spectral ranges other than those in which the dyestuff has its absorption maxima. One method of compensating for errors caused by this overlapping absorption is disclosed and claimed in my U. S. Patent application Serial No. 132,611, filed March 23, 1937. In that application the print of one color separation image is used together with the print of another color separation which has an opposite gradation of opacity. For example, a positive print of the blue-green colored image is combined with a negative print of the magenta colored image to mask out the unwanted print of the blue-green colored image which is obtained during the printing of the magenta colored image.

The present invention is characterized by the use of a color separation image present in one of the layers of a multilayer material, for the purpose of printing a supplementary image into another layer already containing a color separation image, thereby to correct the latter color separation image. The first image will hereinafter be referred to as a "correction image" since it serves as a printing prototype by means of which another image may be corrected. The layer used for recording the correction image is in addition to the layers used for recording the separation images which go to make up the final multicolor picture. The picture layers are each sensitive to light rays used in printing their respective color separations, and the layer used for the correction image is sensitive to light rays used in printing the image for which the correction is to be made. Thus the sensitivity of the layer used for the correction image may or may not be the same as the sensitivity of one of the layers used for recording the separation images which go to make up the final multicolor picture, as will be subsequently explained. The present invention differs from earlier methods of correction in that the correction image is removed after it has served its purpose. In removing this image the whole layer may be removed, or the image contained in the layer may be removed. In other words, the image from which the correction print is obtained does not appear in the corrected picture.

It is therefore an object of my invention to provide an improved method of forming corrected color separation images in which the correction image is formed in one of the layers of a multilayer material containing in a different layer the image to be corrected.

Furthermore, it is an object of my invention to provide such an improved method in which the layer containing the correction image is first developed and printed into a succeeding light sensitive layer of the multilayer material, and then the succeeding layer is finally developed to produce a corrected image.

It is also an object of my invention to provide such an improved method in which the correction image is entirely removed from the multilayer material prior to completion of the final corrected image.

Moreover, it is an object of my invention to provide an improved multilayer material for use in making corrected color separation images wherein the layer recording the image to be corrected is sensitive to the color values to be recorded therein, and the layer recording the correction image is sensitive to light rays absorbed by the image for which the correction is to be made.

The features of my invention which I believe to be novel are set forth with particularity in the appended claims. My invention itself, however, both as to the improved method and the improved material for carrying out the method, together with further objects and advantages thereof, may best be understood by reference to the following description taken in connection with the accompanying drawing in which Figs. 1 to 4 inclusive are schematic diagrams indicating the spectral sensitivities and spectral absorption curves of different embodiments of my improved multilayer material. The spectral characteristics, both with regard to sensitivity and with regard to absorption of any point in the multilayer material, are represented in these figures by a projected spectrum including the visible range and the adjacent ultra-violet and infra-red ranges. Each layer is separately represented, and the location of the support with regard to the superposed layers is indicated diagrammatically. The shaded areas in each spectral representation indicate ranges of absorption, and the X's indicate the predominant sensitivity range.

*Example 1*

In Figure 1, I have shown a light sensitive multilayer material having one layer which is sensitive to those light rays for which the color separation is to be made and another layer which serves for the recording of the correction image and is sensitive to light rays which are mainly absorbed by the image for which the correction is to be made. Layer 1 is a green-sensitive silver bromide layer and layer 2, which is superposed with respect to layer 1, is a red-sensitive silver bromide layer. Both of these layers may be carried by a support 3. This material may be utilized for the production of the green color separation image from a subtractive multicolor image such, for example, as a Kodachrome image. The subtractive image is first printed with a red filter to produce in layer 2 a print of the blue-green colored part image which represents the red separation image. The subtractive image is next printed with a green filter to record in layer 2 a print of the magneta colored part picture which represents the green separation image. As an alternative, both layers 1 and 2 might be printed simultaneously by using a yellow filter. After this printing step, the material shown in Figure 2 is developed, using a rapid developer of the following formula:

| | | |
|---|---|---|
| Water | cc | 750 |
| Methyl alcohol | do | 48 |
| Metol | grams | 14 |
| Hydroquinone | do | 14 |
| Sodium sulphite anhydrous | do | 52.5 |
| Sodium hydroxide | do | 8.8 |
| Potassium bromide | do | 8.8 |
| Water up to | cc | 1,000 |

Only the top layer 2 should be developed. This development has been found to take about one minute or less. However, the exact time of development for any particular material should be established by a preliminary test. When layer 2 has been developed, development is stopped by a bath of 1-2% solution of acetic acid.

Instead of using the rapid developer described above, I may make use of any rapid developer containing substances which prevent the swelling of the emulsion, for example, neutral salts such as a 10-15% solution of sodium sulphate. Following this development, the material is exposed to green light through the layer 2. As a result of this exposure, an image is formed in the green-sensitive layer 1 which has an opposite gradation of opacity with respect to the developed image in layer 2. In other words, the developed negative of the red separation image in layer 2 serves as a correction image, and an additional positive image of the red separation image is recorded in the green-sensitive layer which is as yet undeveloped and which contains a latent negative image of the green separation image. The exposure of layer 1 to green light for the purpose of recording the correction is so regulated that the red separation positive recorded in layer 1 is weak in comparison to the green separation negative and so that it just compensates for the unwanted absorption of the blue-green dye in the green spectral range. The green separation negative and the weak red separation positive recorded in layer 1 are then developed simultaneously, the time of development being established by appropriate preliminary tests.

The development of layer 1 can, if desired, be carried out by means of a color developer such, for example, as a developer consisting of:

| | Grams |
|---|---|
| Diethylparaphenylenediamine | 1 |
| Sodium carbonate anhydrous | 20 |
| Sodium sulphite | .5 |
| 2,4 dichloro-1-naphtol | 1 |

Following this development, the material is treated with Farmer's reducer to remove the silver from both layers 1 and 2. As a result, one obtains a corrected green separation image which is represented in layer 1 by a blue-green dye image.

Alternatively, layer 1 might be predyed; for example, it might contain 1.5 grams of the calcium salt of Xylenwalkgelb G (Schultz Farbstofftobelen Leipzig, 1931, volume 2, page 232) per square meter. After development of layer 1 to form a corrected silver image of the green separation image, a dye image may be formed in layer 1 by color destruction, as described in my U. S. Patent No. 2,020,775. The silver may subsequently be removed by bleaching as described in my U. S. Patent No. 2,042,253. By this treatment, one obtains a yellow positive dye image which represents the corrected green separation image.

Another alternative would be to harden layer 1 in a known manner with chromalum or formalin. This hardening should be carried out to the extent that the emulsion does not melt in water at temperatures in the neighborhood of 80° C. In this alternative embodiment, the layer 2 should be formed from a normal unhardened or weakly hardened emulsion which will melt in warm water between 35° C. and 50° C. This material may be exposed, developed and again exposed, in the manner described above. Layer 1 can then be developed with an ordinary developer to bring out the corrected silver image of the green separation image, and the material can be treated in warm water of approximately 35° C., whereupon the layer 2 melts away. In the use of such a material having emulsion layers hardened to different degrees of hardness, it is not absolutely necessary to stop the development of layer 2 before it reaches layer 1, and before the second exposure of layer 1. Both layers 2 and 1 could be entirely developed but not fixed. Layer 1 could then be exposed with a green light through the red separation image contained in layer 2 and developed a second time, whereupon the material could be subjected to the warm water treatment to melt away layer 2. However, it is generally preferable to interrupt the development after layer 2 has been developed and to then expose layer 1 through the developed image in layer 2, whereupon layer 1 may be developed.

Another possibility is to incorporate a dye-forming substance in layer 1, for example, a substance which is suitable for dye developing or a substance such as that described in my U. S. Patents Nos. 1,956,017 or 2,071,688. A corrected dye image of the green separation image may then be formed in layer 1 which corresponds to the corrected silver image produced therein by the double exposure.

It is also possible to bleach the silver selectively in layer 2 and to fix it out, thereby leaving the corrected silver image in layer 1.

*Example 2*

In Figure 2 I have illustrated schematically a material which is suitable for the production of a complete multicolor image. This material is characterized by the fact that, in addition to the differently sensitized layers containing dyes or dye-formers necessary for the production of the different part images forming the multicolor image, I utilize a light sensitive silver halide layer which does not contain a dye or a dye-former and which is sensitized in such a way that it may serve for the production of a silver image which is not present in the completed multicolor image but which is used at an intermediate point in the process as a correction image. The layer used for producing the correction image may differ from the layers utilized for the production of the differently colored part images in respect to silver content, gradation and sensitivity. The layer serves only for the purpose of receiving a correction image from which a correction may be printed, and after it has served its purpose, the silver is removed from it so that the image does not appear as such in the final multicolor image. The layer which records the correction image is arranged in such a manner that it serves to correct the color separation image recorded in one or more of the picture layers and is so located with respect to the layer or layers which it serves to correct as to be in the path of light to that layer or those layers.

Referring to Figure 2, the support 9 may be formed of either paper or film, since the material may be entirely printed from one side. Layer 5 is a silver halide emulsion containing a blue-green dye, for example, approximately .35 g. diphenyl-fast-bluegreen BL per square meter in the form of its triphenylguanidine salt. The layer is sensitized to red with 20–40 mg. pinacyanol per liter of emulsion. Layer 6 is a silver halide emulsion containing .3 g. Tuchechtrot 3B. Ciba per square meter in the form of a salt of a basic condensation product as disclosed in my British Patent 520,573. The layer is sensitized to green with erythrosin. Layer 7 is a blue sensitive silver bromide emulsion containing 0.4–6 g. of the triphenyl guanidine salt of Xylenwalkgelb G. Layer 8 is a silver chloride emulsion which is sensitized with kriptocyanine. Being a silver chloride emulsion, the layer is not sensitive to the long wave portion of the blue light. While for the sake of simplicity I have not shown the same in Figure 2, it will be understood that an interlayer might be placed between layers 6 and 7 and that this interlayer might contain a suitable filter dye which absorbs short wave blue light. The filter layer might contain 1–2 g. of 4,4′ methyl-bis-[1-(p-sulphophenyl)-3-methyl-pyrazolone-5] per square meter, a dyestuff described in my application S. N. 240,860, filed November 16, 1938, and appropriately precipitated in the emulsion with a basic product as described in my British Patent No. 520,573. Alternatively, layer 8 might contain a filter dye which absorbs the short wave blue light, for example, .2 g. per square meter of the same dye as specified for the aforementioned filter layer.

The material shown in Figure 2 may be used for the printing of a multicolor master image, for example, a multicolor subtractive image such as a Kodachrome image. It will be understood, of course, that the printing might also be carried out with black and white positive separations by using suitable filters as described in my U. S. Patent No. 1,985,344. As a result of such printing, I obtain in layers 5, 6 and 7, latent part images representing the red, green and blue separation images respectively. It will be noted that layers 5 and 8 are sensitized to different wave lengths. The purpose of this differential sensitization is to make it possible to expose layers 5 and 8 independently of each other. For exposing layer 5, a printing light having a wave length between 600 and 620 m$\mu$ is suitable, while a printing light having a wave length above 690 m$\mu$ is particularly suited for printing layer 8. During the printing process, the red separation image is printed into layer 8 as well as into layer 5. The image printed in layer 5 goes to make up part of the final multicolor image, and the image printed in layer 8 later serves to form a correction image.

Following this printing, the material shown in Figure 2 is developed in a rapid developer of the same composition as that specified in Example 1. The development is continued only long enough to completely develop layer 8, whereupon the development is stopped by a 1% solution of acetic acid. The material is then washed and the treatment may be continued with the film in a wet condition, or it may be dried. Following the development of the red separation image recorded in layer 8, the material is exposed diffusely through layer 8 with blue and green printing light. If the image recorded in layer 8 was a negative image of the red separation image, a diffuse exposure to blue and green light will produce a latent positive image in layers 6 and 7. By this procedure the red separation image (the image which is represented by the blue-green dye in the original multicolor master image) is printed into the yellow layer 7 and the magenta layer 6 in the area corresponding to the blue-green image in the master color image. The exposure through the developed image in layer 8 is generally of less intensity than the first exposure of layers 6 and 7 and, in fact, will ordinarily amount to 10–50% of the light used for said first exposure. In any event, this second exposure is carefully adjusted so as to yield a density in layers 6 and 7 which is just sufficient to effect the correction desired in layers 6 and 7 to compensate for the unwanted absorption of the blue-green image.

The material is then developed in a normal developer which serves to develop all of the latent images in layers 5, 6 and 7. Following this, the material is treated with a bath which destroys the dye where silver is present. For this bath I may use a 5% solution of HBr or any other suitable bath such as those described in my U. S. Patent No. 2,020,775. Following this treatment with the dye destruction bath, the silver is removed from layers 5, 6, 7 and 8 and only a pure dye image is left in layers 5, 6 and 7. The silver image in layer 8 which served as a correction image is thus removed from the material and does not appear in the multicolor print.

As pointed out above, I have shown layers 5 and 8 sensitized to the same general spectral range but sensitized to different wave lengths therein. It is also possible to sensitize layers 5 and 8 to the same spectral range and to the same wave lengths therein. In such case it is necessary to carefully balance the light sensitivity of the two layers so as to obtain a full exposure of both layers with the same amount of light and so as not to overexpose either of the layers.

*Example 3*

In Figure 3 I have shown diagrammatically the sensitivity and absorption curves of a modified material especially suited for the practice of my invention. This material comprises a support 10 carrying layer 11, which is a silver bromide emulsion, red sensitive, and containing 1½ g. Xylenwalkgelb G. per square meter. Layer 12 is a blue-sensitive silver bromide emulsion and colored magneta with 1.2 g. of the salt of 1-methylbetanaphthoquinolinium of the dye Tuchechtrot 2B per square meter. Layer 12 is also dyed with .3 g. per square meter of 4,4'-methenyl-bis-[1-(p-sulphophenyl)-3-methyl-pyrazolone-5] in the form of the salt of 1-ethylbetanaphthoquinolinium. This latter dye protects layer 12 from ultra-violet rays. Any other ultra-violet absorbing substance could be used instead of the ultra-violet absorbing dye just mentioned, providing the substance is colorless in visible light; for example, the salts of the alpha and beta naphthol sulphonic acids which are precipitated by basic condensation products, as described in my British Patent 520,573. Layer 13 is a silver bromide emulsion colored blue-green with .6 g. diamine pure blue FF (Schultz l. c. 510) per square meter. Layer 14 is a silver chloride emulsion non-sensitive to the long wave blue light but sensitive to the short wave ultra-violet light.

This material may be used for the printing of color separations in the following manner: The red and green separations can be printed respectively from opposite sides of the material with blue light having a wave length of 400 to 500 m$\mu$. The green separation is, of course, printed into layer 12, which is magenta colored, and the red separation is printed into layer 13, which is blue-green colored. The blue separation image may then be printed with red light into layer 11, which is yellow colored. Subsequently, the red separation may be printed with short wave ultra-violet light of the wave length of approximately 350 m$\mu$ into layer 14. Following these printing steps, the material is developed as described in connection with preceding examples so that layer 14 is separately developed and so that layers 11 and 12 are left undeveloped. The film may then be exposed, either in its wet condition or after being dried, to red or blue light through layer 14, which results in the formation of an image in layers 11 or 12. As heretofore described, this image is opposite in gradation to the developed image in layer 14. The material is then completely developed as explained in connection with previous examples, and is treated in a dye-destroying bath consisting of a 3½% solution of thiocarbamide and citric acid. Following this treatment, the silver is removed from all of the layers and a pure dye image is left in layers 11, 12 and 13. The removal of the silver images eliminates the developed silver image from layer 14 after it has served its purpose as a correction image to print a supplementary image into layers 11 or 12, which reduces the density of the dye images in these layers in proportion to the density of the overlapping portion of the blue-green part image in the original color separation image. It will be understood, of course, that the separation images used as master images for printing into this material are positive separation master images, since the process of dye destruction at the points of the silver images results in the formation of positive dye images in layers 11, 12 and 13.

*Example 4*

In Figure 4, I have shown another modification of a material also especially suited for the practice of my invention. The film shown in Figure 4 contains, in addition to the layers intended for the reproduction of the separation part images, two additional layers, each utilized for the reproduction of a correction image. The layers are coated on opposite sides of a support 15. Layer 16 is a silver halide emulsion dyed blue-green with .7 g. diamine pure blue FF (Schultz l. c. 510). The layer also contains .3 g. of 4,4' methenyl-bis-[1-(p-sulphophenyl)-3-methyl-pyrazolone-5] per square meter. The latter dye absorbs in the ultra-violet portion of the spectrum. Layer 17 is a red sensitive silver halide emulsion layer which is dyed magenta with 1 g. Tuchechtrot 3B per square meter. The red sensitivity is obtained by sensitization with 20–40 mg. pinacyanol per liter. Layer 17 also contains 1–2 g. per square meter of the dye used above in layer 16 for the absorption of ultra-violet. Layer 18 is a green sensitive silver halide emulsion layer dyed yellow with 1.5 g. Xylenwalkgelb G per sq. meter. The outside layer 19 is an ordinary colorless silver bromide emulsion and is only sensitive to blue. Layer 20, which is the outside layer on the other side of the support, is a silver chloride emulsion which is only sensitive to short wave blue light. All of the dyes may be precipitated in the layers as insoluble salts, with basic condensation products as described in my British Patent 520,573.

In using this material for the printing of color separation images, I print the red separation with long wave blue light of 400-500 m$\mu$ into the layer 16, which is dyed blue-green. The green separation is printed into layer 17 with red light, and the blue separation is printed into layer 18 with green light. In addition to printing these color separation images in layers 16, 17 and 18, I also print the red separation into layer 19 with blue light. Furthermore, I print the blue separation into layer 20 with ultra-violet light. In each case the dye present in layers 16 and 18 restricts the exposure of layers 20 and 19 to these layers only. Following these printing steps, the film is developed in a rapid developer such as that set forth in Example 1 so as to develop only the two outer layers 19 and 20. The development is then interrupted, and the film is either dried or further treated in its wet condition. This further treatment consists in exposing the material through layer 19 to yellow light, thereby registering weak latent positive images in layers 17 and 18 of the red separation. These weak latent positive images are obtained from the negative correction image developed in layer 19. The material is also exposed with blue light through layer 20, which exposure serves to create a weak latent positive image in layer 16, this image being derived from the developed correction image in layer 20. The supplementary image of the blue separation created in layer 16 serves to compensate for the overlapping absorption of the blue-green image with the yellow dye. The further processing of the material is the same as in previous examples. It will thus be seen that in this material a correction is made not only in the yellow colored and magenta colored part images, but also in the blue-green colored part image.

I have herein shown and particularly described certain embodiments of my invention and certain methods embraced therein for the purpose of explaining its principle and its application, but it will be obvious to those skilled in the art that many modifications and variations are possible. For example, I may use the additional emulsion layers which serve as carriers for the correction images, to serve at the same time as filter layers. For this purpose I may color these layers either with dye which may be readily destroyed in the developer such as 1.5 g. of 4,4'-methenyl-bis - [1 - (-sulphophenyl) - 3 - methyl-pyrazolone-5] per square meter, or I may use an azodye, for example, 1.5 g. Xylenwalkgelb G per square meter. This is especially suitable in those cases where the filter dye should only be destroyed after development. I may accomplish this result by sensitizing the layer serving to carry the correction image to a spectral range in addition to that used for the purpose of registering the correction image therein and different from the sensitivity ranges used for recording the color separation images in the picture layers. For example, I might sensitize the layer to infra-red of approximately 800 m$\mu$. The dye could then be easily removed by diffusely exposing the filter layer (after the first development) with infra-red light over 800 m$\mu$ which would serve to expose all of the areas which were left unexposed at the time the correction image was printed into the layer. The layer would then be diffusely developed at the time of the second development and, when treated in a dye destroying bath, the filter dye will be entirely destroyed throughout the layer. To illustrate, the layer 8 of Fig. 2 might be placed as an interlayer between layers 6 and 7 and colored with a yellow filter dye. In this case both the surface layer 7 and the interlayer would be developed by the rapid developer but in diffusely exposing with green light layers 5 and 6 would be screened by the yellow filter dye. Furthermore, only the green separation image in layer 6 would be corrected.

Another manner of carrying out my invention consists in the use of dye formers instead of pre-dyeing the layers. Such dye formers are described for example in my U. S. Patent 2,071,688. Alternatively, the dyes may be formed locally by color development. In such case the known components for color developing are incorporated in the layer, or the color images are developed by the known methods of selective color development. If a process of coloring such as that described in my Patent 1,956,122 is used, whereby the layers are all colored one color and then selectively decolored to permit the decolored layer or layers to be colored differently, it will be understood that the layer containing the correction image must be selectively decolored if it has been dyed during the course of the process.

What I claim and desire to secure by Letters Patent of the United States is:

1. A method of producing a corrected photographic image in a multilayer photographic material, including a light sensitive silver halide layer for each color separation image to be recorded in the material, and a supplementary light sensitive silver halide layer, which comprisess printing a color separation image to be recorded into each of said first mentioned layers, printing a correction image into said supplementary layer, developing the latent image thus formed in the supplementary layer, printing the developed image into one of said first mentioned layers to correct a color separation image, and removing the developed image in said supplementary layer from said material.

2. A method of producing a corrected photographic image in a multilayer photographic material, including a light sensitive silver halide layer for each color separation image to be recorded in the material, and a supplementary light sensitive silver halide layer, which comprises printing a color separation image to be recorded into each of said first mentioned layers, printing a correction image into said supplementary layer, developing only the latent image thus formed in the supplementary layer, printing the developed image into one of said first mentioned layers to correct a color separation image, and removing the developed image in said supplementary layer from said material.

3. A method of producing a corrected photographic image in a multilayer photographic material, including a plurality of light sensitive silver halide layers equal in number to the number of color separation images to be recorded in the material, and a supplementary light sensitive silver halide layer, which comprises printing a color separation image to be recorded into each of said first mentioned layers, printing one of said color separation images to be recorded into said supplementary layer, developing the latent image thus formed in the supplementary layer, printing the developed image into one of said first mentioned layers to correct a color separation image, and removing the developed image in said supplementary layer from said material.

4. A method of producing a corrected photographic image in a multilayer photographic material, including a plurality of silver halide layers equal in number to the number of color separation images to be recorded in the material, each being predominantly sensitized to a predetermined spectral range for recording its color separation image, and a supplementary light sensitive silver halide layer sensitized differently from the predominant sensitivities of said first mentioned layers, which comprises printing a color separation image to be recorded into each of said first mentioned layers, printing one of said color separation images into said supplementary layer with light to which said layer is sensitive but which is outside the predominant sensitivity ranges of said first mentioned layers, developing the latent image thus formed in the supplementary layer, printing the developed image into one of said first mentioned layers to correct a color separation image, and removing the developed image in said supplementary layer from said material.

5. A method of producing a corrected photographic image in a multilayer photographic material, including a plurality of silver halide layers equal in number to the number of color separation images to be recorded in the material, each being predominantly sensitized to a predetermined spectral range for recording its color separation image, and a supplementary light sensitive silver halide layer sensitized differently from the predominant sensitivities of said first mentioned layers, which comprises printing said material from one side under a subtractive multicolor image to record a color separation image in each of said first mentioned layers and a predetermined color separation image in said supplementary layer, developing the latent image thus formed in the supplementary layer, printing the developed image into one of said first mentioned layers to correct a color separation image, and removing the developed image in said supplementary layer from said material.

6. A method of producing a corrected photographic image in a multilayer photographic material, including a plurality of silver halide layers equal in number to the number of color separation images to be recorded in the material, each being predominantly sensitized to a predetermined spectral range for recording its color separation image, and a supplementary light sensitive silver halide layer sensitized differently from the predominant sensitivities of said first mentioned layers, which comprises printing said material from one side under a subtractive multicolor image to record a color separation image in each of said first mentioned layers and a predetermined color separation image in said supplementary layer, developing the latent image thus formed in the supplementary layer, printing the developed image into two of said first mentioned layers to correct color separation images therein, and removing the developed image in said supplementary layer from said material.

7. A method of producing a corrected photographic image in a multilayer photographic material, including a plurality of silver halide layers equal in number to the number of color separation images to be recorded in the material, each being predominantly sensitized to a predetermined spectral range for recording its color separation image, and two supplementary light sensitive silver halide layers, which comprises printing a color separation image to be recorded into each of said first mentioned layers, printing a different one of said color separation images to be recorded into each of said supplementary layers, developing the latent images thus formed in said supplementary layers, printing the developed image in each of said supplementary layers into at least one of said first mentioned layers to correct a color separation image, and removing the developed images in said supplementary layers from said material.

8. A method of producing a corrected photographic image in a multilayer photographic material, including a plurality of silver halide layers equal in number to the number of color separation images to be recorded in the material, each being predominantly sensitized to a predetermined spectral range for recording its color separation image, and a supplementary light sensitive silver halide layer sensitized differently from the predominant sensitivities of said first mentioned layers, which comprises printing a color separation image to be recorded into each of said first mentioned layers, printing one of said color separation images into said supplementary layer with light to which said layer is sensitive but which is outside the predominant sensitivity ranges of said first mentioned layers, developing the latent color separation image thus formed in the supplementary layer, printing the developed image into one of said first mentioned layers to correct a different color separation image, and removing the developed image in said supplementary layer from said material.

9. A method of producing a corrected photographic image in a multilayer photographic material, including a plurality of light sensitive silver halide layers equal in number to the number of color separation images to be recorded in the material, and a supplementary light sensitive silver halide layer, which comprises printing a color separation image to be recorded into each of said first mentioned layers, printing one of said color separation images to be recorded into said supplementary layer, developing the latent image of the color separation formed in said supplementary layer, printing the developed image into one of said first mentioned layers to form an image of opposite gradation to correct a color separation image in said layer, and removing the developed image in said supplementary layer from said material.

10. A method of producing a corrected photographic image in a multilayer photographic material, including a plurality of light sensitive silver halide layers equal in number to the number of color separation images to be recorded in the material, and a supplementary light sensitive silver halide layer, which comprises printing a color separation image to be recorded into each of said first mentioned layers, printing one of said color separation images to be recorded into said supplementary layer, developing the latent image of the color separation formed in said supplementary layer, printing the developed image into one of said first mentioned layers to form an image of smaller contrast to correct a color separation image in said layer, and removing the developed image in said supplementary layer from said material.

11. A method of producing a corrected photographic image in a multilayer photographic material, including a light sensitive silver halide layer for each color separation image to be recorded in the material, and a supplementary light sensitive silver halide layer, which comprises printing a color separation image to be recorded into each of said first mentioned layers, printing a correction image into said supplementary layer, developing the latent image thus formed in the supplementary layer, printing the developed image into one of said first mentioned layers to correct a color separation image, removing the developed image in said supplementary layer from said material, and converting the corrected image in said one of said first mentioned layers into a colored image.

12. A method of producing a corrected photographic image in a multilayer photographic material, including a predyed light sensitive silver halide layer for each color separation image to be recorded in the material, and a supplementary light sensitive silver halide layer, which comprises printing a color separation image to be recorded into each of said first mentioned layers, printing a correction image into said supplementary layer, developing the latent image thus formed in the supplementary layer, printing the developed image into one of said first mentioned layers to correct a color separation image, developing the color separation images in each of said first mentioned layers, destroying the dyestuff in each of said first mentioned layers locally in proportion to the silver image, and bleaching out the silver in all of said layers.

13. A method of producing a corrected photographic image in a multilayer photographic material, including a light sensitive silver halide layer for each color separation image to be recorded in the material, and a supplementary light sensitive silver halide layer, which comprises printing a color separation image to be recorded into each of said first mentioned layers, printing a correction image into said supplementary layer, developing the latent image thus formed in the supplementary layer, printing the developed image into one of said first mentioned layers to correct a color separation image, color developing the corrected image in said one of said first mentioned layers, and removing the silver images in all of said layers.

14. A method of producing a corrected color separation image in a multilayer photographic material including a silver halide layer color sensitized for those light rays for which the color separation is made and a supplementary layer color sensitized for those light rays which are predominantly absorbed by the image for which the correction is made, which comprises printing said material under a subtractive multicolor image to record the desired color separation in said first mentioned layer and to record the image for which said correction is made in said supplementary layer, developing the image in said supplementary layer, printing said developed image into said first mentioned layer to correct the color separation image recorded therein, and removing the developed image in said supplementary layer from said material.

15. A method of producing a corrected color separation image in a multilayer photographic material including a silver halide layer color sensitized for those light rays for which the color separation is made and a supplementary layer color sensitized for those light rays which are predominantly absorbed by the image for which the correction is made, which comprises printing said material under a subtractive multicolor image to record the desired color separation in said first mentioned layer and to record the image for which said correction is made in said supplementary layer, developing the image in said supplementary layer, printing said developed image into said first mentioned layer to correct the color separation image recorded therein, color developing the corrected image in said first mentioned layer, and removing the silver images in both of said layers.

BÉLA GÁSPÁR.